(12) United States Patent
Martin

(10) Patent No.: US 8,528,775 B2
(45) Date of Patent: *Sep. 10, 2013

(54) CONTAINER ASSEMBLY

(76) Inventor: Laura Ann Martin, New York, NY (US)

( * ) Notice: Subject to any disclaimer, the term of this patent is extended or adjusted under 35 U.S.C. 154(b) by 1620 days.

This patent is subject to a terminal disclaimer.

(21) Appl. No.: 11/360,203

(22) Filed: Feb. 23, 2006

(65) Prior Publication Data

US 2006/0138134 A1 Jun. 29, 2006

Related U.S. Application Data

(63) Continuation of application No. 10/314,504, filed on Dec. 9, 2002, now Pat. No. 7,007,818.

(51) Int. Cl.
*B65D 21/024* (2006.01)

(52) U.S. Cl.
USPC .......... 220/630; 220/628; 220/23.4; 206/818; 222/142.9

(58) Field of Classification Search
CPC ................................................... B65D 21/024
USPC ....... 220/23.4, 602, 377, 630, 628; 222/431, 222/448, 142.8, 142.9, 553; 206/818
See application file for complete search history.

(56) References Cited

U.S. PATENT DOCUMENTS

| | | | | |
|---|---|---|---|---|
| 1,216,252 A * | 2/1917 | Ferguson | ............... | 222/142.6 |
| 1,714,368 A * | 5/1929 | Hobson | ............... | 222/553 |
| 2,004,828 A * | 6/1935 | Punte | ............... | 220/260 |
| 2,514,416 A * | 7/1950 | Plunkett | ............... | 222/142.3 |
| 5,186,350 A * | 2/1993 | McBride | ............... | 220/739 |
| 5,368,203 A * | 11/1994 | Friedrich et al. | ............... | 222/179.5 |
| 5,873,486 A * | 2/1999 | Morgan | ............... | 220/739 |
| 6,318,569 B1 * | 11/2001 | Rothing | ............... | 211/90.01 |
| D468,162 S * | 1/2003 | Martin | ............... | D7/592 |
| 7,007,818 B2 * | 3/2006 | Martin | ............... | 220/23.4 |
| 7,743,934 B2 * | 6/2010 | Martin | ............... | 220/23.4 |

* cited by examiner

*Primary Examiner* — Stephen Castellano
(74) *Attorney, Agent, or Firm* — Armstrong Teasdale LLP

(57) ABSTRACT

A spice rack assembly includes a rack and at least one container that is magnetically coupled to the rack. The at least one container comprises a body and a lid. The body comprises a sidewall and a bottom, wherein the sidewall circumscribes the bottom. The lid is coupled to the body such that a cavity is defined by an inner surface of the lid, an inner surface of the sidewall, and an inner surface of the bottom. The container sidewall comprises an opening extending therethrough in flow communication with the cavity.

20 Claims, 2 Drawing Sheets

US 8,528,775 B2

CONTAINER ASSEMBLY

The present application is a continuation application of U.S. patent application Ser. No. 10/314,504 filed Dec. 9, 2002, now U.S. Pat. No. 7,007,818, the contents of which are hereby incorporated by reference.

BACKGROUND OF THE INVENTION

This invention relates generally to container assemblies, and more particularly, spice container and rack assemblies.

At least some known houses include a pantry area attached to the kitchen for storing goods used in the kitchen including spices. In fact, at least some known kitchen pantries include racks or shelves that are dedicated to storing known spice shakers or known spice containers. However, because of the orientation of the spice container with respect to the racks, removing a spice shaker from the rack may be cumbersome. As a result, frequently used spices may not be stored in the rack, which makes such spices more accessible, but also may undesirably clutter the kitchen.

Known spice containers include a body and a lid that is threadably coupled to the body. Accordingly, the lid must be unscrewed from the container body to discharge the container contents from the container. To expedite the seasoning process, at least some other known spice containers include a shaker top that includes a plurality of openings that permit the container contents to exit the container when the container is inverted. However, as a result of the openings, such lids may also undesirably permit a loss of aroma of the spices when the spices are stored, which over time, may decrease the effectiveness, freshness, and/or potency of the container contents.

BRIEF SUMMARY OF THE INVENTION

In one aspect, a container assembly is provided. The container assembly comprises at least one container and a base. The container comprises a hollow body and a lid. The body comprises a sidewall and a bottom, wherein the sidewall circumscribes the bottom. The lid is removably coupled to the body such that a cavity is defined by the body and the lid. The at least one container base is magnetically coupled to the base.

In another aspect of the invention, a spice rack assembly is provided. The spice rack assembly comprises a rack and at least one container that is magnetically coupled to the rack. The at least one container comprises a body and a lid. The body comprises a sidewall and a bottom, wherein the sidewall circumscribes the bottom. The lid is coupled to the body such that a cavity is defined by an inner surface of the lid, an inner surface of the sidewall, and an inner surface of the bottom. The container sidewall comprises an opening extending therethrough in flow communication with the cavity.

DETAILED DESCRIPTION OF THE INVENTION

Figure 1:
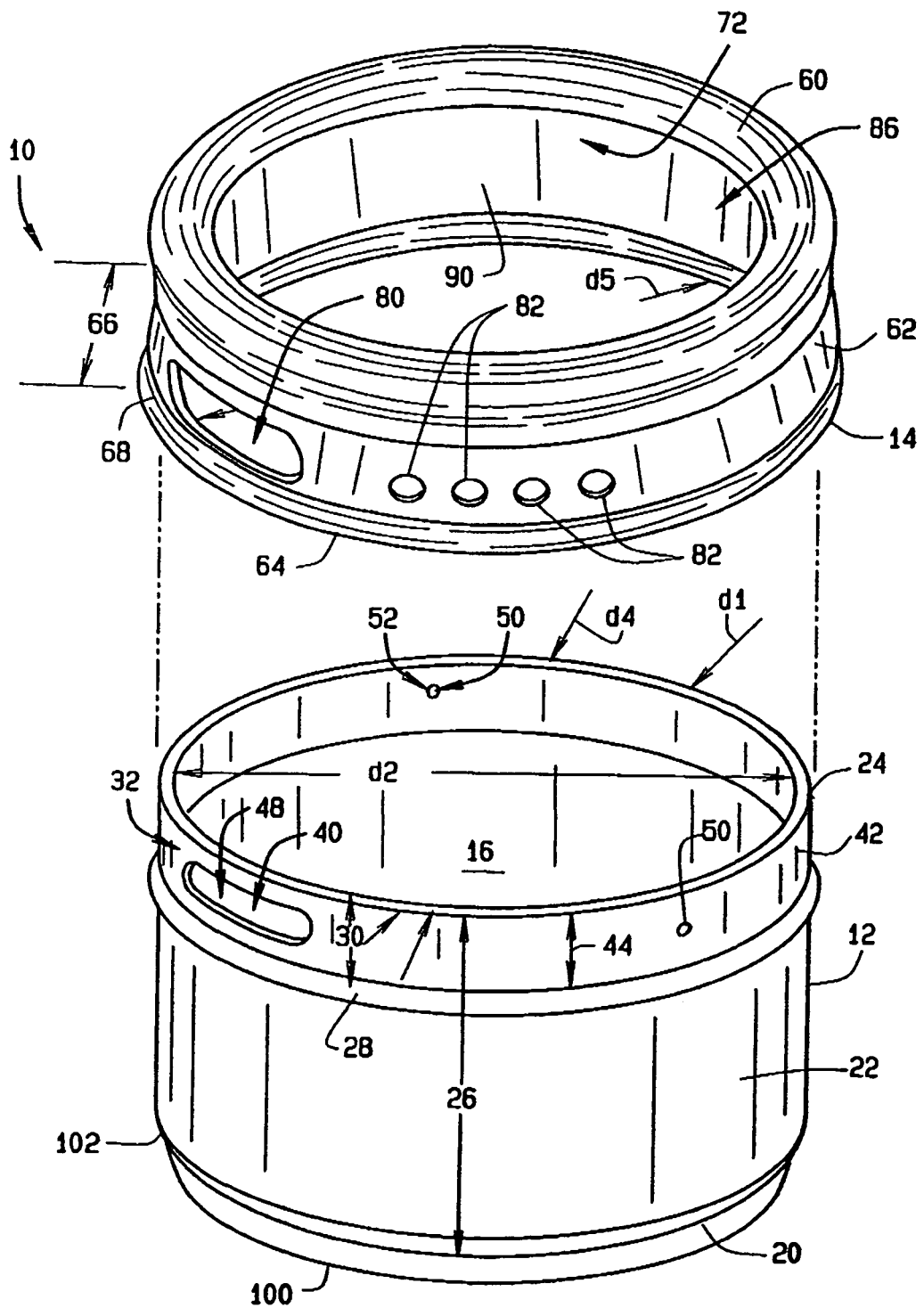
FIG. 1 is perspective exploded view of an exemplary spice container.

FIG. 1 is a perspective view of an exemplary spice container 10. Container 10 includes a body portion 12 and a lid 14 that is rotatably coupled to lid 14. In the exemplary embodiment, body portion 12 and lid 14 both have a substantially circular cross-sectional profile. In an alternative embodiment, at least one of body portion 12 and lid 14 has a substantially non-circular cross-sectional profile. When lid 14 is coupled to body portion 12, a cavity 16 is defined therein.

Body portion 12 has a bottom 20 and a sidewall 22 that circumscribes bottom 20 and extends outwardly therefrom. More specifically, in the exemplary embodiment, sidewall 20 extends substantially perpendicularly from bottom 20 to a rim 24 for a height 26 measured between bottom 20 and rim 24. Sidewall 20 is substantially cylindrical and includes a flange 28 that extends outwardly therefrom. Flange 28, as described below, positions lid 14 with respect to body portion 12 to facilitate sealing between body portion 12 and lid 14. More specifically, flange 28 circumscribes sidewall 22 at a distance 30 from body rim 24, such that a sealing area 32 is defined between rim 24 and flange 28.

Sidewall 22 includes a slotted opening 40 that extends through sidewall 22. More specifically, opening 40 extends through sealing area 32 and in the exemplary embodiment, is substantially elliptical. As described below in more detail, opening 40 enables the contents of container 10 to be emptied while lid 14 remains coupled to body portion 12. Alternatively, opening 40 is non-elliptical.

A ring seal 42 circumscribes sidewall 22 and is positioned within seal area 32, in contact with flange 26. Accordingly, seal 42 has a width 44 that is approximately equal to, or less than, seal area width 30. Seal 42 includes an opening 48 and a pair of identical retainers 50. Opening 48 extends through seal 48 and is sized approximately identically to sidewall opening 40. When assembled, seal opening 48 is aligned substantially concentrically with respect to sidewall opening 40.

Retainers 50 extend radially inwardly from seal 48 to facilitate maintaining seal 48 in alignment with respect to sidewall 22. Specifically, seal retainers 50 extend through a pair of diametrically opposed retainer openings 52 extending through sidewall 22. In the exemplary embodiment, body portion 12 has an outer diameter $d_1$ measured with respect to an outer surface 54 of sidewall 22, and seal 48 has an inner diameter $d_2$ that is slightly larger than outer diameter $d_1$.

Lid 14 includes a cap 60 and a sidewall 62 that circumscribes cap 60 and extends outwardly therefrom. More specifically, in the exemplary embodiment, sidewall 62 extends substantially perpendicularly from cap 60 to a rim 64 for a height 66 measured between cap 60 and rim 64. Sidewall 62 is substantially cylindrical and includes a flange seat 68 that extends outwardly therefrom. Flange seat 68, cooperates with, and mates against, body portion flange 28 to facilitate enhanced sealing between body portion 12 and lid 14. More specifically, flange seat 68 circumscribes sidewall 62 adjacent from rim 64, such that a sealing area 72 is defined between flange seat 68 and cap 60.

Sidewall 62 includes a slotted opening 80 and a plurality of closely-spaced shaker openings 82. More specifically, openings 80 and 82 extend through sidewall 62 within sidewall sealing area 72. In the exemplary embodiment, opening 80 is sized substantially identically with openings 40 and 48, and openings 82 are each sized identically, and are arranged in a row. Alternatively, openings 82 are sized differently. An overall size and position of openings 82 is variably selected to facilitate discharging the contents of container 10 therethrough.

In the exemplary embodiment, cap 60 includes a transparent window 86 that provides a visual indication of any contents of container 10.

Lid 14 has an inner diameter $d_3$ measured with respect to an inner surface 90 of cap sidewall 62. Lid inner diameter $d_3$ is slightly larger than an outer diameter $d_4$ of seal 48 such that when lid 14 is coupled to body portion 12, cap sidewall 62 is in sealing contact with seal 48, and remains in sealing contact even while 14 is rotated with respect to seal 48 and body portion 12. Furthermore, when lid 14 is coupled to body portion 12, seal 48 is positioned radially inwardly from cap sidewall 62 between cap sidewall 62 and body portion sidewall 22.

A magnet 100 is affixed to body portion 12 for magnetically coupling container 10 to a rack assembly (not shown in FIG. 1). Specifically, magnet 100 is affixed to an outer surface 102 of body portion bottom 20. In the exemplary embodiment, magnet 100 is substantially circular. Alternatively, magnet 100 is non-circular. Magnet 100 has a cross-sectional profile that is smaller than a cross-sectional profile of body portion 20, and accordingly, magnet 100 remains in a signature footprint created between bottom 20 and the rack assembly.

During use, container cavity 16 is filled with dry goods, such as, but not limited to seasonings, or spices. Lid 14 is then slidably coupled to body portion 12 such that lid flange seat 68 is positioned against a portion of body portion flange 28. Because flange seat 68 is contoured to substantially match a contoured radius of flange 28, flange seat 68 and flange 28 are coupled in a mating relationship, and cap sidewall 62 is positioned in sealing contact against seal 48. More specifically, the tight tolerance and sealing contact between lid 14 and body portion 12 facilitates maintaining the dry goods in a substantially air-tight environment such that a freshness and useful life of the dry goods is extended.

When a spice is desired to be discharged from container 10, lid 14 is rotated until either lid opening 80 or lid openings 82 are radially aligned with body portion opening 40 and seal opening 48. When rotation of lid 14 is complete, slightly inverting container 10 enables the contents of cavity 16 to be discharged through either opening 80 or openings 82.

Figure 2:
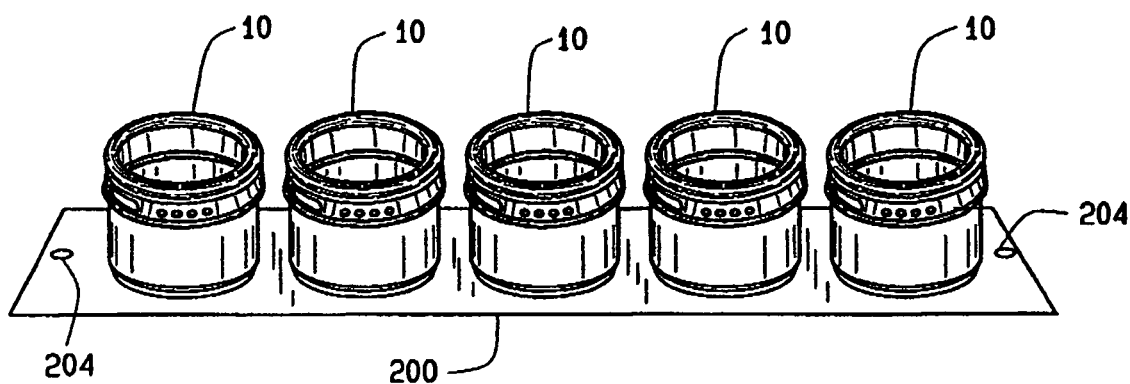
FIG. 2 is a perspective view of an exemplary spice rack including the spice container shown in FIG. 1.

FIG. 2 is a perspective view of an exemplary spice rack 200 including spice container 10. Spice rack 200 is fabricated from a metallic material to enable container 10 to be magnetically coupled to rack 200. In the exemplary embodiment, rack 200 is substantially planar and includes a pair of mounting openings 204 extending therethrough. Mounting openings 204 enable rack 200 to be mounted in a plurality of orientations.

In the exemplary embodiment, rack 200 is sized to enable five containers 10 to magnetically couple thereto. However, it should be noted that overall dimensions of spice rack 200 are variably selected depending upon the quantity of spice containers 10 to be coupled thereto. For example, in one embodiment, rack 200 is substantially rectangular-shaped and is sized to magnetically couple a plurality of rows of containers 10.

The above-described container assembly and spice rack is cost-effective and highly reliable. The container includes a sealing ring that facilitates maintaining sealing contact between the container lid and container body, while still enabling the container lid to be rotatably coupled to the container body. Each container also includes a magnetic base that enables each container to be magnetically coupled to a rack that may be mounted in a plurality of orientations. As a result, an assembly is provided which facilitates storing and dispensing spices in a cost-effective and reliable manner.

Exemplary embodiments of spice racks and container assemblies are described above in detail. The methods are not limited to the specific embodiments described herein, but rather, aspects of each container assembly may be utilized independently and separately from other container assemblies described herein. Each spice rack assembly component can also be used in combination with other spice rack assembly components.

While the invention has been described in terms of various specific embodiments, those skilled in the art will recognize that the invention can be practiced with modification within the spirit and scope of the claims.

What is claimed is:

1. A container assembly comprising:
at least one container comprising a hollow body and a lid, said body comprising a sidewall and a bottom having a bottommost surface, said body sidewall circumscribing said bottom, at least a portion of said lid comprising a transparent material, said lid coupled to said body such that a cavity is defined by said body and said lid, said lid comprising a top and a sidewall circumscribing said top, said sidewall extending from said lid and comprising at least a first opening and a second opening, said first opening having a larger area than said second opening, said first opening having a different shape than said at least one second opening; and
a base, said container bottommost surface magnetically coupled to said base such that said bottommost surface is against said base, said base sized to accommodate at least two of said containers.

2. A container assembly in accordance with claim 1 further comprising a magnet coupled to an exterior surface of one of said container bottom and said base.

3. A container assembly in accordance with claim 1 wherein at least one opening is defined within said container body sidewall.

4. A container assembly in accordance with claim 1 further comprising a seal extending between said container lid and said container body.

5. A container assembly in accordance with claim 1 wherein said container lid is rotatably coupled to said container body.

6. A container assembly in accordance with claim 1 wherein said lid is configured to couple to said container body such that said lid sidewall circumscribes a portion of said container body sidewall.

7. A container assembly in accordance with claim 1 wherein at least a portion of said lid comprises non-transparent material, said at least a first opening and said at least one second opening extend through said non-transparent material.

8. A container assembly in accordance with claim 1 wherein said container body sidewall comprises at least one opening extending therethrough, an area of said body sidewall opening is different than an area of one of said first opening and said second opening of said container lid.

9. A container assembly in accordance with claim 1 wherein said first opening is elliptical.

10. A container assembly in accordance with claim 9 wherein said first opening is oblong.

11. A spice rack assembly comprising:
a magnet;
a rack; and
at least one container magnetically coupled to said rack by said magnet, said at least one container comprising a body and a lid, said body comprising a sidewall and a bottom comprising a bottommost surface, said at least one container magnetically coupled to said rack, said lid coupled to said body such that a cavity is at least partially defined by an inner surface of said lid, an inner surface of said sidewall, and an inner surface of said bottom, at least a portion of said lid comprising a transparent material, at least a portion of said lid sidewall comprises non-transparent material, said container sidewall comprising at least one opening extending therethrough in flow communication with said cavity, said lid comprising at least two openings extending therethrough, one of said at least two openings having a different shape than at least one other of said at least two openings, said rack sized to receive at least two of said containers magnetically coupled thereto.

12. A spice rack assembly in accordance with claim 11 wherein said lid is rotatably coupled to enable said container lid at least two openings to be substantially concentrically aligned with respect to said container sidewall opening.

13. A spice rack assembly in accordance with claim 11 further comprising a seal extending between said container lid and said container body.

14. A spice rack assembly in accordance with claim 11 wherein said container lid non-transparent material circumscribes said transparent material, said lid at least two openings extends through said non-transparent material.

15. A spice rack assembly in accordance with claim 11 wherein said container body sidewall comprises at least one opening extending therethrough, an area of said container body sidewall opening is different than an area of at least one of said lid at least two openings.

16. A spice rack assembly in accordance with claim 11 wherein said container body sidewall comprises at least one opening extending therethrough, an area of said container body sidewall opening is larger than an area of at least one of said lid at least two openings.

17. A spice rack assembly in accordance with claim 11 wherein said container body sidewall comprises at least one non-elliptical opening extending therethrough.

18. A container assembly in accordance with claim 11 wherein said lid is configured to couple to said container such that a substantially air-tight seal is formed between said lid and said container.

19. A container assembly in accordance with claim 11 wherein said container is substantially circular and has an outer diameter that is smaller than an inner diameter of said container lid.

20. A container assembly in accordance with claim 11 wherein said transparent material is plastic and wherein said body is metallic.

* * * * *